United States Patent Office 3,375,952
Patented Apr. 2, 1968

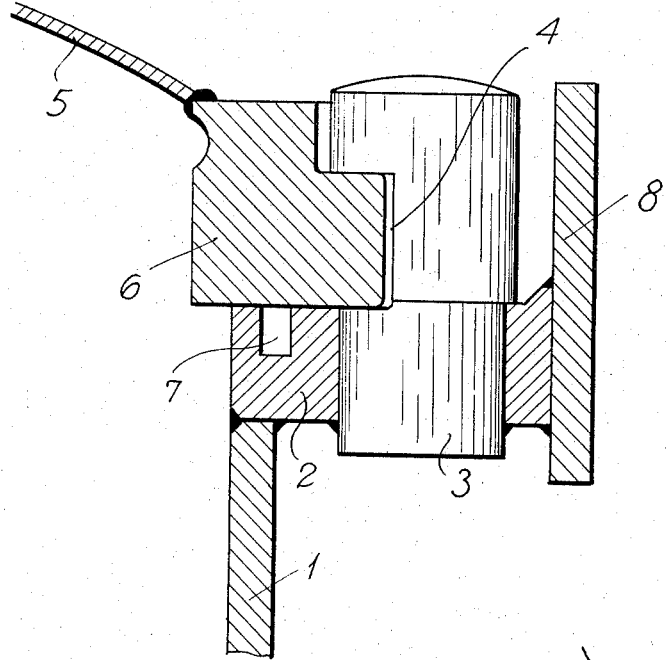
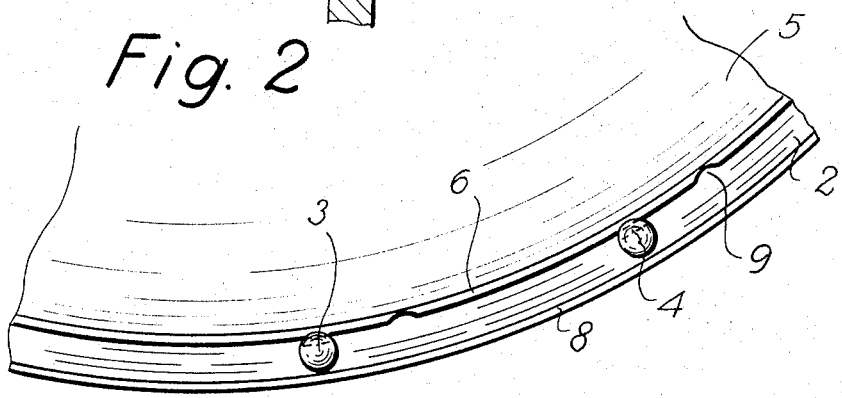

3,375,952
VAT WITH LID
Erik Henningsen, Hvidovre-Copenhagen, Denmark, assignor to Vald. Henriksen A/S, Soborg-Copenhagen, Denmark
Filed Sept. 21, 1966, Ser. No. 580,929
Claims priority, application Denmark, Sept. 23, 1965, 4,893/65
3 Claims. (Cl. 220—40)

The present invention relates to a vat with a circular lid of the kind in which sealing is provided by a packing between the wall of the vat and the edge of the lid and in which the lid is retained by means provided on the edge of the lid and on the wall of the vat, respectively, the said means engaging each other when the lid is turned in relation to the vat.

More particularly the invention is concerned with a vat with lid of the kind used for dyeing and bleaching of yarns and other textiles or, in other words, large metal vats which have to withstand a pressure slightly above atmospheric and the lids of which are therefore of substantial dimensions and weight. It is important that the lid of such vats can be removed and put on quickly so as to avoid delay in the operations.

The vats with lid that are quickest and easiest to operate are those of the aforesaid kind in which the lid is retained by means provided on the edge of the lid and the wall of the vat, the said means being brought into engagement with each other when the lid is turned in relation to the vat. The known vats or containers with lid of the aforesaid kind are formed with projecting lists or teeth on the edge of the lid, adapted to be turned into channels provided in an annular coaming on the wall of the vat. This involves, in particular in vats with large diameter, a weight that is relatively too high since, in order to obtain sufficient rigidity of the vat coaming, it is necessary to reinforce it generally without any possibility in practice of distributing the material in the most favourable manner. This is due to the fact that in view of the forces to which the wall of the vat is subjected it is necessary to keep the eccentricity, that is, the distance between the line of action of the teeth and the centre line of the wall at a minimum. The said known vats with lid have furthermore other serious drawbacks; above all, their process of manufacture is slow and costly because much material has to be milled off in order to form the lists and channels which engage each other and, in addition, the channels are liable to collect impurities.

The vat and lid according to the present invention have no such drawbacks. The essential feature of the vat is a number of pins distributed on the circumference of a flange at right angles to the wall of the vat, the said pins being on the side facing inwardly towards the centre of the vat provided with notches of a height corresponding to the thickness of the edge portion of the lid. The edge portion of the lid is furthermore formed with such a number of recesses so formed and distributed along the circumferences as corresponds to the number, form and distribution of the pins.

By this construction of a vat and lid it remains possible quickly to remove and mount the lid, since the lid has only to be mounted on the vat in such a position that the recesses provided in the edge portion are located opposite the pins, after which the lid is turned whereby the edge of the lid is passed into the notches of the pins and thus is retained. The design has no channels or other cavities that may collect impurities, and it is very cheap and quick to manufacture since only very little material has to be removed by lathe-turning, that is, only the material from the notches in the pins.

In regard to strength the design is furthermore more advantageous than the known designs; in fact, since the forces are transmitted by pins in a flange provided on the wall of the vat, the line of attack for these forces may be freely elected, whereby it becomes possible to use such a section that a maximum moment of inertia is obtained for the amount of material used. Any damage to the vat and lid according to the invention is furthermore easier to repair because the pins may readily be replaced and the flange readily be re-ground, whereas milled teeth and channels of the known designs are difficult to repair.

According to the invention the flange provided at right angles to the wall of the vat is preferably projecting outwards so as not to block the opening of the vat. This will furthermore render it very easy to replace the pins.

The pins according to the invention are preferably cylindrical and the recesses in the edge portion of the lid are of corresponding circular arc form, which is the simplest design to manufacture.

The invention will be further described with reference to the drawing, in which:

FIGURE 1 shows a part of a vat with lid, viewed in section, and

FIGURE 2 is an end view of a part of a vat with lid on a reduced scale.

In the figures, 1 is the wall of the vat, 2 a flange at right angles thereto in which there are provided cylindrical pins 3 spaced apart along the whole circumference. The said pins 3 are on the side facing inwardly towards the centre of the vat provided with notches 4. The lid of the vat is denoted by 5 and the edge portion of the lid is 6. The said edge portion is of a thickness corresponding to the height of the notches 4. Sealing between the lid and the vat is effected by means of a packing 7 which in a manner known per se may be subjected to pressure from below through channels not shown. On the outer side of the flange 2 is attached a protective ring 8 which is concentric with the wall of the vat and serves to provide a rigid design. The edge portion of the lid is formed with circular arc recesses 9 the number and location of which along the circumference correspond to the number and location of the pins 3 of the flange 2. In the position of the lid illustrated in FIGURE 2 the lid is locked, its edge 6 being retained by the notches 4 provided in the pins. When the lid is turned so that the recesses 9 are opposite the pins 3 the lid may be removed.

In the embodiment shown in the drawing the pins 3 are welded to the flange 2, but they may also be formed as bolts screwed into position from below, or they may be retained by a nut on the underside of the flange.

What I claim and desire to secure by Letters Patent:
1. A vat with a circular lid of the kind in which sealing is provided by a packing between the wall of the vat and the edge of the lid and in which the lid is retained by means provided on the edge of the lid and on the wall of the vat, respectively, the said means engaging each other when the lid is turned in relation to the vat, characterised by a number of pins distributed on the circumference of a flange at right angles to the wall of the vat, the said pins being on the side facing inwardly towards the centre of the vat provided with notches of a height corresponding to the thickness of the edge portion of the lid, the said edge portion being provided with recesses of such number and form and so distributed along the circumference as corresponds to the number, form and distribution of the pins.

2. A vat and lid as claimed in claim 1, characterised in that the flange at right angles to the wall of the vat is projecting outwardly.

3. A vat and lid as claimed in claim 1 characterized in that the pins are cylindrical and the recesses in the edge portion of the lid are of circular arc form.

References Cited

UNITED STATES PATENTS 3,076,577   2/1963   Craig _____ 220—40

THERON E. CONDON, *Primary Examiner.*

J. B. MARBERT, *Assistant Examiner.*